United States Patent [19]
Jackula et al.

[11] 4,234,756
[45] Nov. 18, 1980

[54] PRETERMINATED BLOCK SYSTEM AND METHOD OF INSTALLING SAME

[75] Inventors: Michael J. Jackula; Hans J. Ziegler, both of Milwaukee, Wis.

[73] Assignee: Reliable Electric Company, Franklin Park, Ill.

[21] Appl. No.: 25,009

[22] Filed: Mar. 29, 1979

[51] Int. Cl.³ .............................................. H02G 9/02
[52] U.S. Cl. ...................................... 174/38; 29/868; 174/60; 174/72 R; 174/78
[58] Field of Search ....................... 174/37, 38, 51, 60, 174/72 R, 78, 88 R; 29/628

[56] References Cited
U.S. PATENT DOCUMENTS

| | | | |
|---|---|---|---|
| 3,725,581 | 4/1973 | Gillemot et al. | 174/38 |
| 3,991,264 | 11/1976 | Connell | 174/38 |
| 4,068,914 | 1/1978 | Mack | 174/38 X |

Primary Examiner—Laramie E. Askin
Attorney, Agent, or Firm—Quarles & Brady

[57] ABSTRACT

A predetermined block system for use in outside underground utility distribution networks, such as networks for providing telephone service, includes factory installed cable stubs spliced into a main distribution cable and encapsulated at predetermined intervals along the length of the distribution cable. The free ends of each cable stub are attached to one side of a terminal block which is adapted to be mounted in an aboveground or flush to the ground closure. Service wires may then be attached to the other side of the block. The cable stub includes a pair of bond wires insulated from each other. At a splice opening formed in the distribution cable one bond wire is connected to a field side and the other bond wire is connected to the central office side of the cable shields of the distribution cable. The bond wires terminate at commonly grounded terminal posts in the terminal block. The common ground may be provided by a ground braid fastened to the closure. This ground braid provides an aboveground disconnect feature for isolating and testing different sections of the buried distribution cable shields. The cable stub also includes twisted pairs of conductor wires spliced into preselected distribution wires carried within the distribution cable and connected to one side of conductive terminal posts mounted in the terminal block.

20 Claims, 3 Drawing Figures

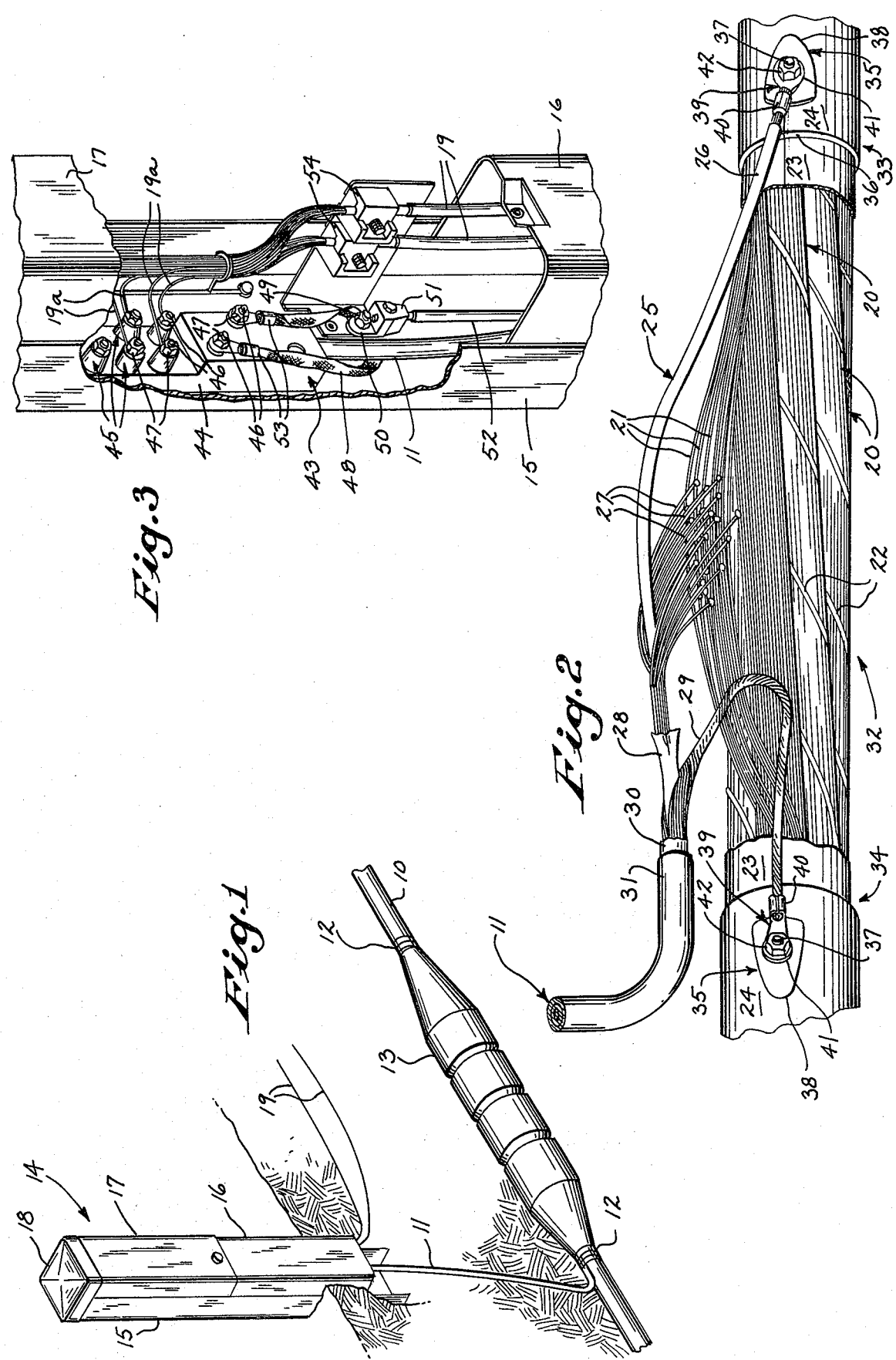

4,234,756

PRETERMINATED BLOCK SYSTEM AND METHOD OF INSTALLING SAME

BACKGROUND OF THE INVENTION

This invention relates to utility distribution networks, and more particularly, to a preterminated block system for use with buried distribution cable installations.

In recent years, utility distributors such as telephone companies have begun providing their services to residential customers in total out-of-sight plants. The concept of out-of-sight plants in the design of outside telephone distribution networks involves the use of field terminations between distribution cables and service wires which lead to individual customers. These terminations between distribution cables and service wires are located entirely underground and therefore must be carefully spliced and encapsulated to prevent damage. The need for quality splices and encapsulations between distribution cables and service wires as well as the desire to reduce costs has led to factory prefabrication of distribution networks, including the encapsulated connections, for later placement in the field. This allows for high quality testing prior to burying the connections.

Encapsulated terminations between distribution cables and service wires have conventionally been prefabricated by stringing out the distribution cable in a zig-zag or U arrangement, and splicing and encapsulating the service wires to the distribution cable at predetermined intervals along the length of the cable. Both the distribution cable and its service wires may then be wound up onto a reel and later transported to the job site and buried in a trench.

A more recent development is the reel-to-reel system which makes possible a more compact layout for prefabricating splices and encapsulations between distribution cables and service wires. In this system, the distribution cable is pulled off of one reel, passed through a work station where several service wires, usually, four, are spliced and encapsulated at predetermined intervals and then both the cable and service wires are reeled up onto a second reel ready for installation. The reel-to-reel system eliminates the large space requirements necessary in the zig-zag or U arrangements.

Preterminated service wires installed according to either of the above methods, however, have several disadvantages. Changes and rearrangements of the system are extremely difficult to make once the system is buried. If there are ultimately six customers to service instead of four or if additional wires for extra service or equipment is needed by a particular customer, the buried distribution cable must first be located and carefully dug up. Additional service wires must then be directly spliced into the distribution wire and encapsulated while working in the field. Furthermore, there are no aboveground test points provided along the cable to easily and quickly pinpoint any cable jacket or shield damage which may occur during or after installation of the distribution cable and its service wires.

A prefabricated distribution network in accordance with the present invention provides aboveground access points along the buried distribution cable to permit changes and rearrangements of the system as well as in-service testing capabilities not available from either of the above installations.

SUMMARY OF THE INVENTION

In accordance with the invention there is provided a preterminated block system which includes a distribution cable having distribution wires circumferentially surrounded by a cable shield with the distribution cable having a splice opening along a portion of its length to define separate sections of cable shield, terminal means having a grounded terminal and conductive terminals, a first bond conductor connected between one section of cable shield and the grounded terminal, a second bond conductor connected between the other section of cable shield and the grounded terminal, and conductor wires bonded at their lower ends to preselected distribution wires and connected at their upper ends to the conductive terminals.

The bond conductor and the conductor wires may be fabricated into a single cable stub, and the distribution cable may be buried underground. For use underground, a protective moisture-proof splice enclosure encapsulates and seals the connections between the cable stub and distribution cable. When the distribution cable is buried, the cable stub extends upwardly to the surface and may be connected to terminal posts of a terminal block mounted within a pedestal-type closure so that service connections may be made aboveground or flush with the ground. The bond conductors may then be connected to first and second ground terminal posts having a common grounding strap.

A ground braid may also be used to provide the common ground. The braid is fastened and grounded to the closure at a point intermediate its length with its ends terminated to the first and second ground terminal posts of the terminal block. The braid bonds the buried cable shields and provides an aboveground disconnect feature for isolating and testing the shields of various buried distribution cable sections.

Furthermore, in accordance with the invention there is provided a method of installing a preterminated block system which includes a distribution cable having distribution wires circumferentially surrounded by a metallic cable shield and a cable jacket circumferentially surrounding the cable shield, comprising the steps of forming a splice opening in the distribution cable to expose the distribution wires by removing a portion of the cable jacket and shield at a predetermined interval along the length of the distribution cable, terminating one end of a first bond conductor to the cable shield on one side of the splice opening, terminating one end of a second bond conductor to the cable shield on the other side of the splice opening, bonding one end of conductor wires to preselected distribution wires and connecting the other ends of the first and second bond conductors to commonly grounded terminals of a terminal block and the other ends of the conductor wires to conductive terminals of the terminal block.

It is a general object of this invention to provide a preterminated block system for a utility distribution cable which is factory installed so that adequate quality control may be maintained for the installation.

It is another object of this invention to provide an aboveground site for locating buried distribution cable sections and isolating suspect noise problems.

It is also an object of this invention to provide an aboveground central location for service wire connections to a buried distribution cable which permits ease in repairing, replacing, rearranging and adding these connections.

The foregoing and other objects and advantages of the invention will appear from the following description. In the description, reference is made to the accompanying drawings which form a part hereof, and in which there is shown by way of illustration and not of limitation a preferred embodiment of the invention. Such embodiment does not represent the full scope of the invention, but rather the invention may be employed in different embodiments and reference is made to the claims herein for interpreting the breadth of the invention.

BRIEF DESCRIPTION OF THE DRAWINGS

FIG. 1 is a fragmentary view in perspective of a buried distribution cable installation in accordance with the present invention;

FIG. 2 is a fragmentary view showing the connections of a cable stub to the distribution cable; and FIG. 3 is a fragmentary view with parts cut away showing the connections of the cable stub and service wires to a terminal block within a closure.

DESCRIPTION OF THE PREFERRED EMBODIMENT

Referring to the drawings, FIG. 1 shows a preterminated block system for a residential utility distribution cable system. The block system disclosed herein is developed specifically for buried cable installations, but may also be adapted for use in totally aboveground applications. The block system includes a main distribution cable 10 which is shown buried underground with the lower end of a cable stub 11 spliced therein. Although FIG. 1 shows only a single cable stub 11 spliced into the distribution cable 10, it is to be understood that a series of cable stubs 11 may be spliced therein at predetermined intervals along the entire length of the distribution cable 10. The entire splice area between the cable stub 11 and distribution cable 10 is completely wrapped by electrical tape 12, and encapsulated and sealed by a splice enclosure 13. The splice enclosure 13 may typically be a collar which is heat shrinkable or filled with a potting compound to protect the splice area from moisture and other damaging elements found in the earth. The free or upper end of the cable stub 11 extends upwardly towards the earth's surface and into a pedestal-type closure 14. The closure 14 consists of a back panel 15, a lower front panel 16, an upper front panel 17 and a cap 18. The lower end of the closure 14 is open in order to provide access to its interior for the buried cable stub 11 and other buried cables and wires used to make service connections, cable splices, or cross connections above ground. The upper front panel 17 is removable so that above-ground access to the interior of the closure is also provided. FIG. 1 also shows two buried service cables 19 leading into the closure 14 for connection to the cable stub 11.

Referring now to FIG. 2, it can be seen that the inner core of the main distribution cable 10 is comprised of several bundles 20 of distribution wires 21. Each bundle 20 is comprised of a plurality of individual distribution wires 21 wrapped by a color coded string 22 for identifying the bundles 20. Each individual distribution wire 21 is comprised of a copper conductor coated with an insulating plastic sheath. The distribution wires 21 have different colored plastic sheaths which readily identify individual wires. Each plastic sheath may also have a stripe fabricated therein of a color different from the color of the sheath to further identify individual distribution wires 21. Surrounding all the bundles 20 of distribution wires 21 is a wrapping of transparent mylar insulation (not shown), and then a metallic shield 23 consisting of a thin layer of aluminum. The aluminum shield 23 provides the distribution wires 21 with electrostatic shielding from spurious signals as well as protection of the distribution wires 21 from the effects of lightning and power surges. Circumferentially surrounding the aluminum shield 23 is a cable jacket 24 comprised of a suitable material such as rubber or plastic, which will protect the distribution wires 21 and metallic shield 23 from moisture and other elements.

The cable stub 11 includes an inner bond conductor or bond wire 25 comprised of a plurality of individual metallic conductors braided together and coated with a plastic insulation material 26. Wrapped around the inner bond wire 25 are twisted pairs of conductor wires 27. These conductor wires 27 are similar to the distribution wires 21 in that each has an inner copper conductor coated with a colored plastic sheath. However, one conductor wire 27 is twisted together with a second conductor wire 27 to form twisted pairs, and these pairs are then wrapped around the inner bond wire 25. Surrounding the inner bond wire 25 and the twisted pairs of conductor wires 27 is a transparent insulation 28 such as mylar. Surrounding the outside of the mylar insulation 28 is an outer bond conductor or bond wire 29. The outer bond wire 29 is comprised of a plurality of individual metallic conductors braided together and wrapped around the mylar insulation 28. Circumferentially surrounding the bond wires 25,29 and conductor wires 27 is an aluminum shield 30 which also serves to protect the bond wires 25,29 and conductor wires 27 from spurious signals, lightning and power surges. Finally, circumferentially surrounding the aluminum shield 30 is a rubber or plastic cable jacket 31 which serves to protect the entire structure.

It should be noted that the inner and outer bond conductors 25 and 29 of the cable stub 11 may take forms other than those shown, and are not limited to the embodiment of conventional wires. For example, the bond conductors 25 and 29 could consist of coaxial layers of thin metal similar to the aluminum shields 23 and 30 of the distribution cable 10 and cable stub 11. Therefore, it is not intended to limit the bond conductors 25 and 29 to the specific structure of conventional wires as shown and described herein.

The method for making an encapsulated splice between the cable stubs 11 and the distribution cable 10 will now be described. The distribution cable 10 is prepared for splicing by locating the appropriate place on the cable 10 where the cable stub 11 is to be spliced. This may be accomplished by simply following the footage markings conventionally applied to the outside of the cable jacket 24 of the distribution cable 10. A splice opening 32 is then made in the distribution cable 10 by removing both its cable jacket 24 and its aluminum shield 23. The splice opening 32 is approximately 8 inches long and the cable jacket 24 and shield 23 may be removed by cutting them with a knife or other sharp instrument. This procedure divides the cable jacket 24 and shield 23 into two sections, a field section 33 and a central office section 34, and exposes the bundles 20 of distribution wires 21. The mylar wrapping around all the bundles 20 and the string 22 around one particular bundle 20 of distribution wires may then be removed to expose a plurality of individual distribution wires 21.

The final step in preparing the distribution calbe 10 for splicing is the installation of bonding clamps 35 to the sides of the splice opening 32 so that they are in intimate contact with the cable shields 23 on either side of the splice opening 32. The cable jacket 24 and shield 23 on both sides of the splice opening 32 is longitudinally slit approximately one inch, as at 36, to accommodate the bonding clamps 35. The bonding clamps 35 may be of any conventional design and each normally includes a triangular shaped base (not shown) having an integral threaded stud 37 extending upwardly therefrom to mount first a perforated plate (not shown) and then an upper plate 38. Each clamp 35 may be installed by sliding its base and perforated plate, with its perforated points up, between the bundles 20 of distribution wires 21 and the aluminum shield 23 by passing the stud 37 along the slit in the cable jacket 24 and shield 23. The upper plate 38 is then mounted on the stud 37 on the outside of the cable jacekt 24 to sandwich the shield 23 and jacket 24 therebetween. In order to fasten the inner and outer bond wires 25,29 to the bonding clamps 35 ring terminals 39 are fastened to the lower ends of the inner and outer bond wires 25,29. These ring terminals 39 are comprised of a heel 40 which is crimped around the conductors at the lower ends of the bond wires 25,29, and a ring portion 41 which may be slipped over the stud 37 of the bonding clamp 35. A washer and nut assembly 42 may then be turned down on the stud 37 to tightly fasten each bond wire 25,29 to the bond clamps 35 and cable shields 23.

Having prepared the distribution cable 10 in the above described manner, the twisted pairs of conductor wires 27 may than be bonded or spliced to selected individual distribution wires 21. The distribution wires 21 are selected according to the color code found on their sheaths, and are bonded to the conductor wires 27 by means of conventional wire connectors which connect the conductors of each pair of conductor wires 27 to an individual conductor of a distribution wire 21 in a known manner. For purposes of clarity, FIG. 2 does not show the wire connectors but merely schematically illustrates the connections between the distribution wires 21 and conductor wires 27. Although the use of wire connectors is preferred, any splicing technique such as soldering may be used which insures a permanent contact between the conductor wires 27 and distribution wires 21.

The entire splice opening 32 including the lower ends of the bond wires 25,29 and conductor wires 27 of the cable stub 11 may then be wrapped with electrical tape 12, and encapsulated and sealed in a protective enclosure by means of a splice enclosure 13. Any conventional technique for encapsulating splices may be used. Typically, the splice enclosure 13 may be heat shrunk around the splice opening 32 or filled with a potting compound so that a moisture proof enclosure may be obtained.

The cable stub 11 is typically attached to a terminal means or block 43 at its free or upper end as an assembly prior to splicing its conductor wires 27 to the distribution wires 21, as described above. The terminal block 43 may be of any common form and as shown in FIG. 3 generally includes a molded, dished housing 44 having a series of spaced openings in its face. The housing 44 may be formed of a plastic in a known manner so that it is electrically nonconductive. A terminal post 45 extends through each opening and has an inner end (not shown) extending into the interior of the housing and an outer end 46 extending from the face of the housing 44. The terminal post 45 may typically be a stud-type post in which case the conductor of a wire may be held against removal by simply turning down a nut 47 on the outer end 46 of the post. The terminal post 45 may also be of the binding post type in which case the outer end 46 of the terminal post includes an internally threaded axial bore which receives a screw and a cross bore which receives the conductor of a wire to be held against removal by tightening of the screw within the threaded bore. The housing 44 is normally open to the back and the individual conductors of the twisted pairs of conductor wires 27 as well as those of the bonding wires 25,29 are individually mechanically connected, soldered or welded to the inner ends of the terminals 45. The dished housing 44 is then commonly filled with a potting compound whose purpose is to protect the electrical connections made to the terminals 45 within the housing 44 and to provide a mechanical bond to maintain the terminals 45 and conductors in place. The cable stub 11 and integral block 43 extend upwardly to the surface so that the terminal block 43 may be mounted within the closure 14 as shown in FIG. 3. The terminal block 43 is screwed to a flat support mounted on the rear panel 15 of the closure 14 with the terminals 45 projecting outwardly to allow for manual connections to the terminals 45 extending from the front of the block 43.

In particular, the twisted pairs of conductor wires 27 of the cable stub 11 are connected to the upper or conductive terminals 45 which are insulated from ground since they are mounted directly on the non-conductive housing 44. Each twisted pair of conductor wires 27 is connected to a complementary pair of laterally adjacent terminals 45. The bond wires 25,29 of the cable stub 11 are connected at their upper ends to a pair of lower or ground terminals 45 which are connected to a common ground by a ground strap or braid 48, as hereinafter will be described. These lower terminals 45 are identified as field and central office terminals in order to indicate which section of buried cable shield 23 they are respectively connected to.

The ground braid 48 is comprised of a plurality of braided metallic conductors fastened to the closure near its center by means of a nut and bolt assembly 49 extending through a flange 50 of a clamp 51 which is grounded by means of a ground wire 52. Each end of the ground braid 48 is terminated with ring terminals 53. The ring terminals 53 are connected to the field and central office terminal posts which effectively bonds the buried cable shields to ground and provides a disconnect feature for isolating and testing the shields. Testing for suspect noise problems or damaged cable shields along different sections of the distribution cable 10 becomes simply a matter of finding the aboveground closures 14 which identify the ends of each section. The upper front panels 17 of the closure 14 are easily removed and the ground braids 48 may be readily found. Once the ground braids 48 are located, the end of the ground braid 48 connected to the field terminal in one closure 14 and the end of the other ground braid 48 connected to the central office terminal in the other closure 14 are removed. The buried cable shields between these two closures are thus isolated and may be tested in any conventional manner at this above-ground location for opens, shorts, grounds, splits and shield continuity.

Individual service wires 19a of the service cables 19 are terminated to the outer ends of the upper terminal posts 45 of the block 43 such that each service wire 19a is connected to a matching pair of laterally adjacent terminals. The service cables 19 are fastened and grounded commonly to the inside of the closure 14 in the usual manner, such as by clamps 54.

In summary, a preterminated block system may be installed by first connecting a cable stub 11 having an inner bond wire 25, an outer bond wire 29, and a plurality of twisted pairs of conductor wires 27 to a terminal block 43. This is accomplished by terminating the pairs of conductor wires 27 to the inner ends of complementary upper terminal posts 45 in the block 43, and by terminating the bond wires 25,29 to the lower field and central office terminal posts 45, respectively. The block 43 is then filled with potting compound to secure the posts 45 and wires 25,27,29 in place.

After connecting the cable stub 11 to the terminal block 43, the point on the distribution cable 10 where the other end of the cable stub 11 is to be spliced is located. Then, by using a knife or similar instrument a splice opening 32 is made in the distribution cable 10 by removing both the cable jacket 24 and the metal shield 23. This divides the cable shields into a central office section 34 and a field section 33. Bonding clamps 35 are then installed on either side of the splice opening 32 by slitting the cable jacket 24 and shield 23 approximately 1 inch to facilitate their installation. A bonding clamp 35 for each side of the splice opening 32 is then slid into position such that the cable jacket 24 and shield 23 is sandwiched between its base and perforated plate, and the upper plate 38 of the bonding clamp 35. Next, the mylar wrapping around the bundles 20 and the string 22 around one bundle 20 of distribution wires 21 is removed and the individual distribution wires 21 to be spliced are selected according to the color codes on their sheaths. The lower end of the cable stub 11 is then ready to be spliced into the distribution cable 10. The lower end of the inner bond wire 25 of the cable stub 11 is then terminated to the field side 33 of the splice opening 32 by slipping the ring portion 41 of its ring terminal 39 over the bonding clamp stud 37 and turning down a washer and nut assembly 42. Then the lower end of the outer bond wire 29 is terminated to the central office side 34 of the splice opening 32 by slipping the ring portion 41 of its ring terminal 39 over the bonding clamp stud 37 on that side of the opening 32 and turning down a corresponding washer and nut assembly 42. Each twisted pair of conductor wires 27 is then connected to individual preselected distribution wires 21 and the entire splice opening 32 and lower end of the cable stub 11 is taped with electrical tape 12, and then encapsulated and sealed by a moisture proof splice enclosure 13. After a plurality of cable stubs 11 and integral blocks 43 have been spliced into a particular length of distribution cable 10, the cable stubs 11, blocks 43 and distribution cable 10 are wound up onto a reel and later transported to a job site and placed in a trench.

When the distribution cable 10 is covered with earth and buried, the free or upper end of the cable stubs 11 including the bond wires 25,29 connected to the lower terminals of the terminal block 43, and the conductor wires 27 connected to the upper terminals of the block 43 are brought up to the surface. The terminal block 43 is then mounted in a closure 14 and a ground strap or braid 48 is fastened to the closure 14 and to the outer ends of the lower terminal posts 45 of the bond wires 25,29. This ground braid 48 effectively grounds and bonds the buried cable shields and provides the disconnect feature for isolating and testing sections of these shields. Service wires 19 may then be terminated to the outer ends of the upper terminal posts 45 of the block 43 and clamped to the inside of the closure 14 in the usual manner.

It should be noted that the preterminated block system described above is compatible with all cable splicing techniques, and may be used with any of the conventional splice enclosures, such as heat shrunk collars or closures filled with potting compound. It should also be noted that the isolation of the cable shields is at an overground or flush to the ground location so that individual cable sections may be readily located in order to test for and isolate suspect noise problems along sections of the distribution cable 10.

We claim:

1. A preterminated block system, comprising:
   a distribution cable which includes distribution wires circumferentially surrounded by a cable shield, said distribution cable having a splice opening along a portion of its length to define separate sections of cable shield;
   terminal means including a grounded terminal and conductive terminals for providing service connections to the distribution cable;
   a first bond conductor connected between one section of cable shield and the grounded terminal of said terminal means;
   a second bond conductor connected between the other section of cable shield and the grounded terminal of said terminal means; and
   conductor wires bonded at their lower ends to preselected distribution wires and connected at their upper ends to the conductive terminals of said terminal means.

2. A preterminated block system in accordance with claim 1, wherein:
   said distribution cable is adapted to be buried underground and said terminal means is adapted to be mounted at an aboveground or flush to the ground location.

3. A preterminated block system in accordance with claim 1, wherein:
   said terminal means includes a terminal block mounted within a closure.

4. A preterminated block system in accordance with claim 1, wherein:
   said bond conductors and said conductor wires are fabricated within a cable stub.

5. A preterminated block system in accordance with claim 1, wherein:
   said grounded terminal includes a pair of terminal posts connected together by a common grounding strap; and
   the first bond conductor is connected to one of said posts and the second bond conductor is connected to the other of said posts.

6. A preterminated block system, comprising:
   a distribution cable which includes distribution wires circumferentially surrounded by a metallic cable shield, said distribution cable having a splice opening along a portion of its length to define separate sections of cable shield;
   a terminal block including commonly grounded terminal posts and a plurality of conductive terminal posts for providing service connections to the distribution cable; and a cable stub connected between said distribution cable and said terminal block which includes:

(a) a first bond wire connected at its lower end to one section of the cable shield and at its upper end to a grounded terminal post of said terminal block;

(b) a second bond wire insulated from the first bond wire connected at its lower end to the other section of cable shield and at its upper end to a second grounded terminal post of said terminal block; and (c) twisted pairs of conductor wires bonded at their lower ends to preselected distribution wires and connected at their upper ends to the conductive terminal posts.

7. A preterminated block system in accordance with claim 6, wherein:
said distribution cable is buried underground and said terminal block is mounted within a closure at an aboveground or flush to the ground location.

8. A preterminated block system in accordance with claim 6, further including:
a braid wire grounded to the closure at a point intermediate its length having one end fastened to the first grounded terminal post and the other end fastened to the second grounded terminal post, said braid wire providing the common ground for said grounded terminal posts to bond the cable shields together.

9. A preterminated block system in accordance with claim 6, further including:
a splice enclosure encapsulating the splice opening in said distribution cable and the lower ends of said bond and conductor wires.

10. In a utility distribution network system, the combination comprising:
a distribution cable having distribution wires circumferentially surrounded by a metallic cable shield, said distribution cable having a splice opening along a portion of its length to separate said shield into separate sections;
a terminal block having commonly grounded terminals and a plurality of conductive terminals;
a cable stub connected between said distribution wires and said terminal block which includes:

(a) a first bond wire connected at its lower end to one section of cable shield;

(b) a second bond wire connected at its lower end to the other section of said cable shield, said first and second bond wires connected at their upper ends to the commonly grounded terminals of said terminal block; and (c) conductor wires bonded at their lower ends to preselected distribution wires and connected at their upper ends to the conductive terminals of said terminal block; and a splice enclosure encapsulating the splice opening in said distribution cable and the lower ends of said bond and conductor wires.

11. An article of manufacturing, comprising:
a terminal block which includes ground terminals and a plurality of conductive terminals; and
a cable stub connected to said terminal block which includes:

(a) a first bond conductor connected at one end to a ground terminal of said terminal block;

(b) a second bond conductor connected at one end to another ground terminal of said terminal block; and (c) conductor wires connected at their upper ends to the conductive terminals of said terminal block.

12. An article of manufacture in accordance with claim 11, wherein:
said bond conductors and said conductor wires are fabricated coaxially within said cable stub with the conductor wires wrapped around the first bond conductor and the second bond conductor wrapped around the conductor wires.

13. An article of manufacture in accordance with claim 12, wherein:
said ground terminals include a central office terminal and a field terminal; and
said first bond conductor is connected to the field terminal and said second bond conductor is connected to the central office terminal.

14. An article of manufacture in accordance with claim 11, wherein:
said first and second bond conductors are wires.

15. A method of installing a preterminated block system which includes a distribution cable having distribution wires circumferentially surrounded by a metallic cable shield and a cable jacket circumferentially surrounding the cable shield, comprising the steps of:
forming a splice opening in the distribution cable to expose the distribution wires by removing a portion of the cable jacket and shield at a predetermined interval along the length of the distribution cable;
terminating one end of a first bond wire to the cable shield on one side of the splice opening;
terminating one end of a second bond wire to the cable shield on the other side of the splice opening;
bonding one end of conductor wires to preselected distribution wires; and
connecting the other ends of the first and second bond wires to commonly grounded terminals of a terminal block and the other ends of the conductor wires to conductive terminals of the terminal block.

16. A method of installing a preterminated block system in accordance with claim 15, wherein:
the bond wires are terminated to the cable shields by attaching them to bonding clamps which are in intimate contact with the cable shields.

17. A method of installing a preterminated block system which includes a distribution cable having distribution wires circumferentially surrounded by a metallic cable shield and a cable jacket circumferentially surrounding the cable shield, comprising the steps of:
splicing a cable stub which includes first and second bond wires and a plurality of conductor wires into the distribution cable by:

(1) forming a splice opening in the distribution cable to expose the distribution wires by removing a portion of the cable jacket and shield at a predetermined interval along the length of the distribution cable;

(2) terminating the lower end of the first bond wire to the cable shield on one side of the splice opening;

(3) terminating the lower end of the second bond wire to the cable shield on the other side of the splice opening;

(4) bonding the lower ends of the conductor wires to preselected distribution wires;

encapsulating the splice opening in the distribution cable and the lower ends of the bond and conductor wires; and
connecting the upper ends of the first and second bond wires to commonly grounded terminals of a terminal block and the upper ends of the conductor wires to conductive terminals of the terminal block.

18. A method of installing a preterminated block system in accordance with claim 17, comprising the additional steps of:
 burying the distribution cable underground; and
 mounting the terminal block in a closure disposed at an aboveground or flush to the ground location.

19. A method of installing a preterminated block system in accordance with claim 17, wherein: the lower ends of the conductor wires are bonded to the distribution wires by wire connectors.

20. A method of installing a preterminated block system in accordance with claim 17, comprising the additional steps of:
 fastening a braid wire to ground at a point intermediate its length and fastening one of its ends to the grounded terminal of the first bond wire and the other of its ends to the grounded terminal of the second bond wire to provide the commond ground for said grounded terminals and to bond the cable shields together.

* * * * *